United States Patent
Wei et al.

(10) Patent No.: US 8,949,568 B2
(45) Date of Patent: Feb. 3, 2015

(54) MEMORY STORAGE DEVICE, AND A RELATED ZONE-BASED BLOCK MANAGEMENT AND MAPPING METHOD

(75) Inventors: Qingsong Wei, Singapore (SG); Kanzo Okada, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/119,839

(22) PCT Filed: May 23, 2012

(86) PCT No.: PCT/SG2012/000181
§ 371 (c)(1),
(2), (4) Date: Nov. 22, 2013

(87) PCT Pub. No.: WO2012/161659
PCT Pub. Date: Nov. 29, 2012

(65) Prior Publication Data
US 2014/0095827 A1  Apr. 3, 2014

(30) Foreign Application Priority Data
May 24, 2011 (SG) .................................. 201103755

(51) Int. Cl.
*G06F 12/00* (2006.01)
*G06F 13/00* (2006.01)
*G06F 13/28* (2006.01)
*G06F 12/08* (2006.01)
*G06F 12/02* (2006.01)
*G06F 3/06* (2006.01)

(52) U.S. Cl.
CPC ............ *G06F 12/08* (2013.01); *G06F 12/0246* (2013.01); *G06F 3/061* (2013.01); *G06F 3/0631* (2013.01); *G06F 3/0644* (2013.01); *G06F 3/0679* (2013.01); *G06F 2212/7201* (2013.01)
USPC ........................................... 711/173; 711/103

(58) Field of Classification Search
CPC ..................... G06F 12/0246; G06F 2212/7201
USPC ........................................ 711/103, 170–173
See application file for complete search history.

(56) References Cited

U.S. PATENT DOCUMENTS

| 7,774,525 | B2 | 8/2010 | Farhan et al. |
| 2003/0163630 | A1 | 8/2003 | Aasheim et al. |
| 2007/0150693 | A1 | 6/2007 | Kaneko et al. |

(Continued)

OTHER PUBLICATIONS

Park, Dongchul, CFTL: An Adaptive Hybrid Flash Translation Layer with Efficient Caching Strategies, IEEE Sep. 2011, available at: http://www-users.cs.umn.edu/~park/docs/IEEETC.pdf.*

(Continued)

*Primary Examiner* — Ryan Bertram
(74) *Attorney, Agent, or Firm* — Blakely, Sokoloff, Taylor & Zafman LLP

(57) ABSTRACT

A storage device is disclosed, in which the device comprises memory (222) divisible into multiple zones, each zone comprising a plurality of physical blocks of the memory (222) and for associating with a zone-based address map for mapping between logical and physical addresses of said zone. The multiple zones are configurable independently of each other, and the memory (222) is non-volatile or volatile memory. A related zone-based block management and address mapping method, and a zone-based block management and address map for a storage device are also disclosed.

43 Claims, 17 Drawing Sheets

(56) References Cited

U.S. PATENT DOCUMENTS

| | | | |
|---|---|---|---|
| 2009/0106486 A1* | 4/2009 | Kim et al. | 711/103 |
| 2009/0193184 A1 | 7/2009 | Yu et al. | |
| 2010/0030948 A1 | 2/2010 | Moon et al. | |
| 2010/0070688 A1* | 3/2010 | Lin | 711/103 |

OTHER PUBLICATIONS

Wu, Chin-Hsien, An Adaptive Two-Level Management for the Flash Translation Layer in Embedded Systems, ICCAD 2006, available at: http://rtlab.csie.ntu.edu.tw/course/rts2011/papers/An%20Adaptive%20Two-Level%20Management%20for%20the%20Flash%20Translation%20Layer%20in%20Embedded%20Systems.pdf.*

PCT Notification of Transmittal of the International Search Report and the Written Opinion of the International Searching Authority, or the Declaration for PCT Counterpart Application No. PCT/SG2012/000181, 10 pgs., (Aug. 6, 2012).

PCT Notification of Transmittal of International Preliminary Report on Patentability (Chapter II of the Patent Cooperation Treaty) for PCT Counterpart Application No. PCT/SG2012/000181, 4 pgs., (Sep. 18, 2012).

Abhinav Sharma, "An Inter-Disk Wear-Leveling Strategy for Flash SSD Disk Arrays", retrieved from the Internet: http://sdsu-dspace.calstate.edu/handle/10211.10/335, 52 pgs., (2010).

"Solid-State Drive", Wikipedia, retrieved from the Internet: http://en.wikipedia.org/w/index.php?title=Solid-state_drive&oldid=430262392, 11 pgs., (May 21, 2011).

"Wear Leveling", Wikipedia, retrieved from the Internet: http://en.wikipedia.org/w/index.php?title=Wear_leveling&oldid=414176973, 2 pgs., (Feb. 16, 2011).

Yeonseung Ryu, "A Flash Translation Layer for Multimedia Storages," 2010 IEEE International Conference on Multimedia and Expo (ICME), pp. 808-813 (Jul. 19-23, 2010).

* cited by examiner

| | |
|---|---|
| Page Read to Register | 25μs |
| Page Program (Write) from Register | 200μs |
| Block Erase | 1.5ms |
| Serial Access to Register (Data bus) | 100μs |
| Die Size | 2 GB |
| Block Size | 256 KB |
| Page Size | 4 KB |
| Data Register | 4 KB |
| Erase Cycles | 100 K |

| Workload | Avg. Req. Size (KB) | Write (%) | Seq. (%) | Avg. Req. Inter-arrive Time(ms) |
|---|---|---|---|---|
| Fin1 | 8.291986 | 35% | 0.6% | 8.189 |
| Fin2 | 7.776166 | 17% | 0.7% | 11.081 |
| Exchange | 54.593399 | 74% | 0.5% | 1.315 |
| DevDiv91 | 36.168616 | 91% | 0.9% | 2.044 |

Figure 9

MEMORY STORAGE DEVICE, AND A RELATED ZONE-BASED BLOCK MANAGEMENT AND MAPPING METHOD

CROSS-REFERENCE TO RELATED APPLICATIONS

This patent application is a U.S. National Phase Application under 35 U.S.C. §371 of International Application No. PCT/SG2012/000181, filed May 23, 2012, entitled A MEMORY STORAGE DEVICE, AND A RELATED ZONE-BASED BLOCK MANAGEMENT AND MAPPING METHOD, which claims priority to Singapore Patent Application No. 201103755-3, filed May 24, 2011.

FIELD

The present invention relates to a memory storage device, and a related zone-based block management and mapping method.

BACKGROUND

Solid-State Devices (SSDs) use non-volatile memory as their storage medium and an example of non-volatile memory is NAND flash memory. The Flash Translation Layer (FTL), a firmware implemented in the SSDs, allows host operating systems to access the flash memory in a similar manner as accessing conventional hard disk drives (i.e. refer to FIG. 1). The FTL therefore plays a key role in SSDs in terms of performing data address mapping, garbage collection and wear leveling. Generally, FTL schemes can be classified into three respective groups depending on the granularity of address mapping performable: page-based, block-based, and hybrid FTL schemes.

For page-based FTL scheme, a logical page number (LPN) is mapped to a physical page number (PPN) in the flash memory. This mapping approach achieves high performance, high space usage and low garbage collection overhead, but requires a large working memory to store a large-sized mapping table (e.g. the mapping table size is 64 MB for a 32 GB SSD). Furthermore, page-based FTL is not scalable because the mapping table size linearly increases with the SSD capacity. Hence, it is challenging to use page-based FTL to manage large scale SSDs. On the other hand, block-based FTL significantly reduces the mapping table size and works reasonably well under sequential intensive workload. It however requires an expensive read-modify-write operation when writing only a part of a data block. Block-based FTL also encounters other issues in terms of poor performance, low space usage and high garbage collection overhead under random workload. In order to overcome the disadvantages of page-based and block-based FTL schemes, the hybrid FTL scheme was proposed. Hybrid FTL uses a block-based mapping to manage most data blocks and uses a page-based mapping to manage a small set of log blocks, which works as a buffer to accept incoming write requests. As such, it improves the write performance and only requires a small-sized mapping table. However, Hybrid FTL incurs expensive garbage collection overhead for random write dominant workloads.

Existing FTL schemes are unable to perform sufficiently well to handle enterprise-level workloads, which are a mixture of random and sequential accesses, because they suffer from inherent limitations in terms of performance, mapping table size, garbage collection overhead, and scalability.

One object of the present invention is therefore to address at least one of the problems of the prior art and/or to provide a choice that is useful in the art.

SUMMARY

According to a $1^{st}$ aspect of the invention, there is provided a storage device comprising memory divisible into multiple zones, each zone comprising a plurality of physical blocks of the memory and for associating with a zone-based address map for mapping between logical and physical addresses of said zone. The multiple zones are configurable independently of each other.

Advantages of the described $1^{st}$ aspect of the invention include dividing the memory into multiple memory zones based on demand, and each memory zone may be independently configurable and may dynamically use page-based address mapping (i.e. to form page zones) or block-based address mapping (i.e. to form block zones), in accordance with the determined nature of the workload of an application environment. Furthermore, the locality of data access may be leveraged in order that sequential large-sized data are stored in the block zones and random small-sized data are written into the page zones. Thus, working the described $1^{st}$ aspect of the invention advantageously results in higher performance, efficiently uses smaller-sized mapping tables, minimising garbage collection overhead, and is scalable and workload adaptive.

Preferably, the multiple zones may be created dynamically. In addition, the storage device may further comprise a Flash Translation Layer (FTL) configured to dynamically apply page-based address mapping or block-based address mapping for each zone. Moreover, the either page-based address mapping or block-based address mapping may be applied depending on the type of data to be stored in the respective zone.

More preferably, if the data to be stored is random data, the FTL may be configured to store the random data based on page-based address mapping. Conversely, if the data to be stored is sequential data, the FTL may preferably be configured to store the sequential data based on block-based address mapping. Furthermore, each zone may be configurable with a same number of physical blocks of memory. Yet additionally, some of the zones may preferably have different numbers of physical blocks of memory.

Yet more preferably, the zone-based address map may include a global mapping table for mapping between logical block number and zone number for the multiple zones. Also, the global mapping table may further be configured for mapping between logical blocks and physical blocks of memory for block zones. Additionally, the zone-based address map may further include a plurality of zone mapping tables for mapping between logical and physical pages of memory for page zones. Preferably, the storage device further may include a working memory and the entire global mapping table may fully be loaded into the working memory. Yet preferably, the plurality of zone mapping tables may partially or fully be loaded into the working memory in dependence on the size of the working memory. The global mapping table may include a physical block number for representing an associated entry that is mapped to one of the plurality of zone mapping tables, wherein the physical block number may be −1.

Further preferably, the storage device may be arranged to receive an access request associated with a logical page number, and the storage device may further be arranged to search the global mapping table to obtain a zone number of the multiple zones based on a calculated logical block number. More specifically, if the zone number corresponds to one of the page zones, the storage device may further be arranged to search the zone mapping table of the corresponding zone to obtain a physical page number, and to deliver the request based on the zone number and the physical page number of the corresponding zone. On the other hand, if the zone number corresponds to one of the block zones, the storage device may further preferably be arranged to obtain a physical block number directly from the global mapping table, and to deliver the request based on the zone number and the physical block number of the corresponding zone and a block offset. In addition, the memory may preferably include non-volatile or volatile memory.

According to a $2^{nd}$ aspect of the invention, there is provided a zone-based block management and address mapping method for a storage device including memory, the method comprising dividing the memory into multiple zones, each zone comprising a plurality of physical blocks of the memory, and associating each zone with a zone-based address map for mapping between logical and physical addresses of said zone. The multiple zones are configurable independently of each other.

Preferably, the method may further comprise dynamically creating the multiple zones. Additionally, the method may further comprise dynamically applying page-based address mapping or block-based address mapping for each zone. Moreover, the either page-based address mapping or block-based address mapping may be applied depending on the type of data to be stored in the respective zone.

More preferably, if the data to be stored is random data, the method may comprise storing the random data based on page-based address mapping, whereas if the data to be stored is sequential data, the method may then comprise storing the sequential data based on block-based address mapping. Moreover, the method may further comprise configuring each zone with a same number of physical blocks of memory.

Yet preferably, the method may further comprise configuring some of the zones with different numbers of physical blocks of memory. Also the zone-based map may include a global mapping table for mapping between logical block number and zone number for the multiple zones. Further, the global mapping table may further be configured for mapping between logical blocks and physical blocks of memory for block zones. Yet still, the zone-based map may further comprise a plurality of zone mapping tables for mapping between logical and physical pages of memory for page zones. Preferably, the global mapping table may include a physical block number for representing an associated entry that is mapped to one of the plurality of zone mapping tables, wherein the physical block number may be −1.

Yet more preferably, the method may further comprise receiving an access request associated with a logical page number, and searching the global mapping table to obtain a zone number of the multiple zones based on a calculated logical block number. Particularly, if the zone number corresponds to one of the page zones, the method may further include searching the zone mapping table of the corresponding zone to obtain a physical page number, and delivering the request based on the zone number and physical page number of the corresponding zone. Conversely, if the zone number corresponds to one of the block zones, the method may then further include obtaining a physical block number directly from the global mapping table, and delivering the request based on the zone number, the physical block number of the corresponding zone and a block offset. In addition, the memory may preferably include non-volatile or volatile memory.

Preferably, the method may also further comprise assigning a portion of the memory as a buffer zone for classifying a workload to be managed by the method, wherein the buffer zone includes a plurality of physical blocks of the memory, and the workload is classified when the zone buffer is determined to be full. More specifically, if a page count of a physical block of memory in the buffer zone exceeds a predefined threshold, the method may further include moving data in the associated physical block in the buffer zone to the block zones, wherein the predefined threshold is adjustable in accordance with the classified workload. Conversely, if a page count of a physical block of memory in the buffer zone is below the predefined threshold, the method may further include moving data in the associated physical block in the buffer zone to the page zones, wherein the predefined threshold is adjustable in accordance with the classified workload.

According to a $3^{rd}$ aspect of the invention, there is provided a storage device configured for storing data using the zone-based block management and address mapping method based on the $2^{nd}$ aspect of the invention. The device comprises a plurality of Single-level Cell (SLC) memory chips configured as page zones, and a plurality of Multi-level Cell (MLC) memory chips configured as block zones. The SLC and MLC memory chips respectively store random data and sequential data, and the memory chips are non-volatile memory.

According to a $4^{th}$ aspect of the invention, there is provided a storage device configured for storing data using the zone-based block management and address mapping method based on the $2^{nd}$ aspect of the invention. The device comprises a plurality of phase-change memory chips (PCRAM) or STT-MRAM memory chips configured as page zones, and a plurality of flash memory chips configured as block zones. The PCRAM or STT-MRAM, and flash memory chips respectively store random data and sequential data, and the memory chips are non-volatile memory.

According to a $5^{th}$ aspect of the invention, there is provided a storage device configured for storing data using the zone-based block management and address mapping method based on the $2^{nd}$ of the invention. The device comprises a plurality of non-volatile memory chips configured as page zones, and a magnetic disk configured as block zones. The non-volatile memory chips and magnetic disk respectively store random data and sequential data.

According to a $6^{th}$ aspect of the invention, there is provided a zone-based block management and address map for a storage device, the storage device including memory divided into multiple zones with each zone having a plurality of physical blocks of the memory, the map comprising a global mapping table for mapping between logical block number and zone number of memory, the global mapping table is further configured for mapping between logical blocks and physical blocks for block zones, and a plurality of zone mapping tables for mapping between logical and physical pages of memory for page zones.

It should be apparent that features relating to one aspect of the invention may also be applicable to the other aspects of the invention.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIG. 8 is a table of configuration parameters of a simulated SSD used in simulations to benchmark the method of FIG. 3;

FIG. 9 is a table of configuration parameters characterising different types of workload used in the simulations of FIG. 8 to benchmark the method of FIG. 3;

DETAILED DESCRIPTION OF PREFERRED EMBODIMENTS

Figure 1:
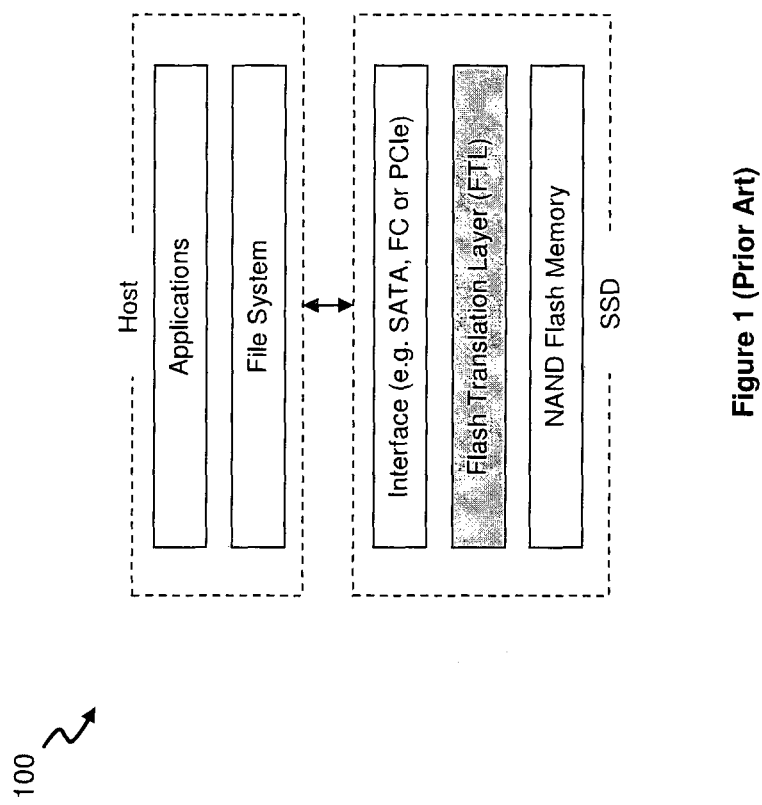
FIG. 1 is a schematic diagram illustrating communication between a host system and a solid-state device (SSD), according to the prior art.
Figure 2:
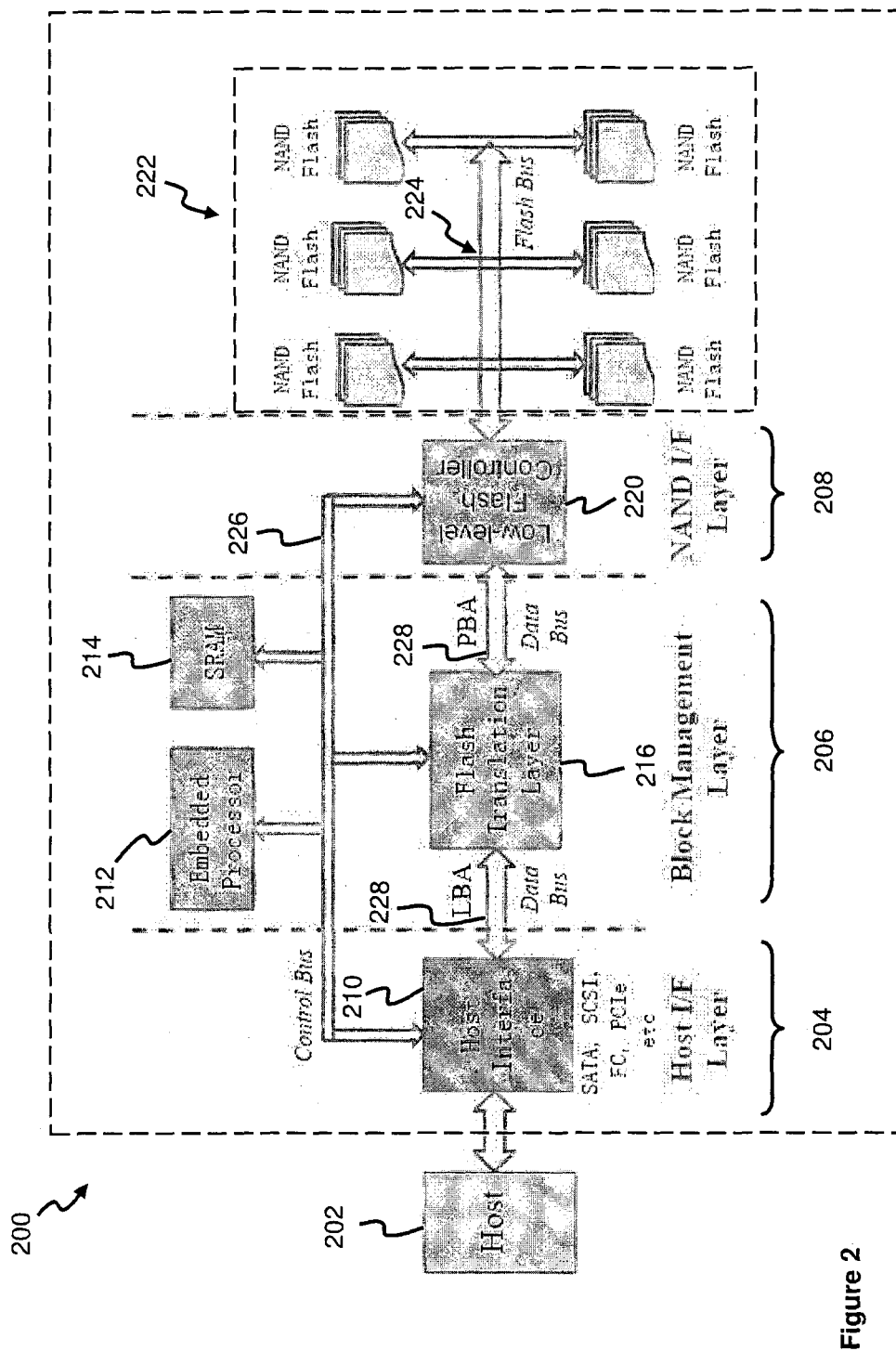
FIG. 2 is a schematic diagram of a SSD system architecture according to a first embodiment of the invention.

FIG. 2 shows a Solid-State Device (SSD) system architecture 200 (hereinafter SSD architecture), according to a first embodiment. The SSD architecture 200 is implemented in SSD (not shown) which is accessible by a host system 202 (e.g. a personal computer). Particularly, the SSD architecture 200 is subdivided into three levels of interface layers, respectively being a Host Interface Layer (HIL) 204, a Block Management Layer (BML) 206, and a NAND (flash memory) Interface Layer (NIL) 208. At the HIL 204 level, the SSD architecture 200 includes a host interface unit 210 which enables the host system 202 to gain system access to the SSD. The host interface unit 210 is implementable using any existing host interfacing standards (e.g. Serial Advanced Technology Attachment (SATA), Small Computer System Interface (SCSI), Fibre Channel (FC), Peripheral Component Interconnect Express (PCIe) or the like) known to a skilled person.

On the other hand, the BML 206 level includes an embedded processor 212, a static ram (SRAM) module 214, and a Flash Translation Layer (FTL) 216 which performs address mapping and block management. In particular, the FTL 216 is a piece of firmware (i.e. program code) which is stored in a flash memory (not shown), and at run-time (i.e. execution time), the embedded processor 212 loads the FTL 216 into the SRAM 214 to be executed in order to commence address mapping. The NIL 208 level includes a low-level flash memory controller 220, which is in turn electrically coupled to and for controlling a plurality of NAND flash memory modules (hereinafter NAND modules) 222. Each of the NAND modules 222 is then communicably interconnected to each other via a flash bus 224. Further, a control bus 226 communicably interconnects the host interface unit 210, embedded processor 212, SRAM module 214, FTL 216, and memory controller 220 to one another.

At the BML 206 level, the embedded processor 212 is configured to handle processing of any incoming/outgoing requests from/by the host system 202/memory controller 220, while the SRAM 214 provides a working memory area for the embedded processor 212 for the processing of those requests. Accordingly, the FTL 216 determines how data is stored, mapped and addressed on the SSD in the NAND modules 222. Specifically, the FTL 216 creates a lookup/mapping table, which is subdivided into a logical block address (LBA) section and a physical block address (PBA) section. Based on a specific data request received, the host interface unit 210 passes the corresponding LBA to the FTL 216. The FTL 216 then converts the LBA to PBA (where the data is stored) by searching within the mapping table and thereafter passes the located PBA to the memory controller 220. The memory controller 220 consequently retrieves the data from the PBA and forwards the retrieved data to the host interface unit 210, which are eventually transmitted out (from the SSD) to the host system 202. The retrieved data is subsequently forwarded by the memory controller 220 to the host interface unit 210, and eventually transmitted out to the host system 202. The FTL 216, host interface unit 210, and memory controller 220 are interfaced to each other via a data bus 228.

Further embodiments of the invention will be described hereinafter. For the sake of brevity, description of like elements, functionalities and operations that are common between the embodiments are not repeated; reference will instead be made to similar parts of the relevant embodiment(s).

Figure 3:
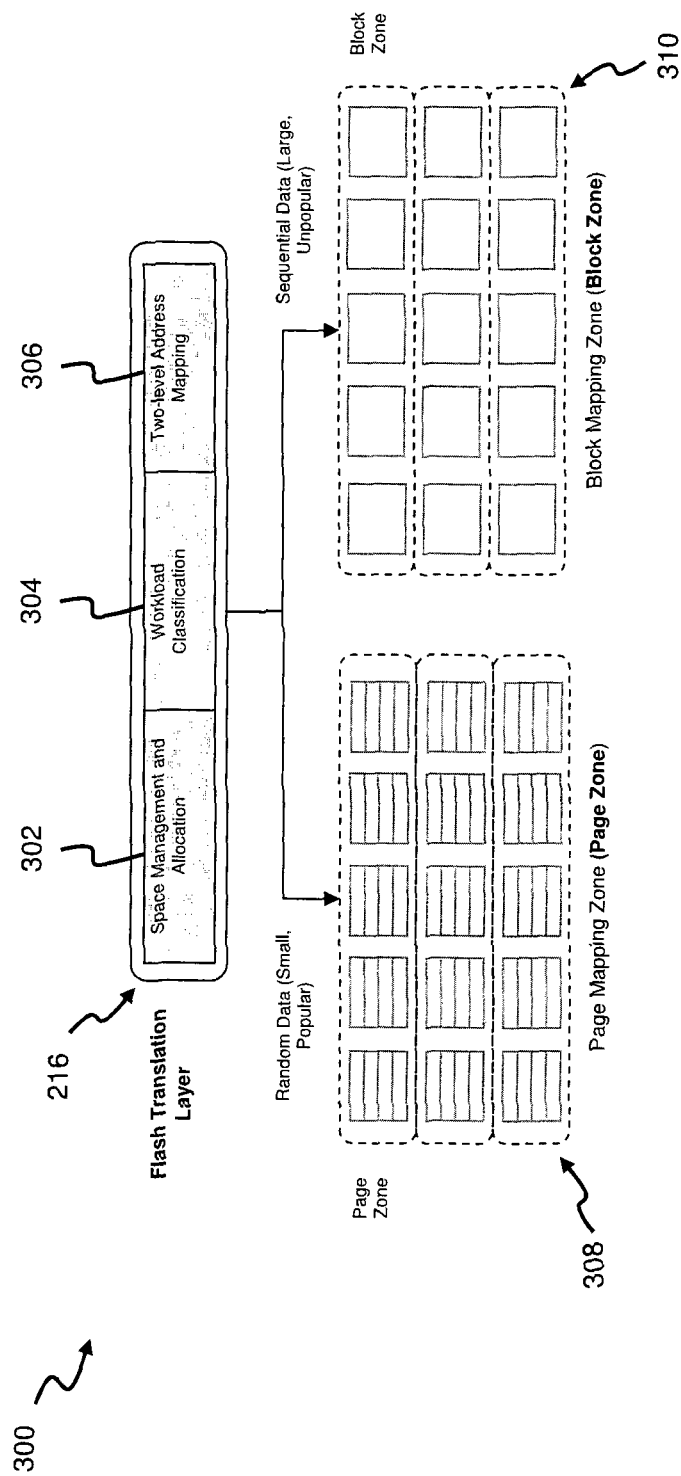
FIG. 3 illustrates the architecture of a zone-based block management and (address) mapping method according to a second embodiment of the invention, in which the method is performable using the SSD system architecture of FIG. 2.

FIG. 3 illustrates the architecture of a zone-based block management and (address) mapping method 300 according to a second embodiment. The method 300 is also otherwise termed as "Z-Map", which will be referred to as such in the description from hereon. In particular, Z-Map 300 is implemented as three different functional modules, which are to be loaded into and executed by the embedded processor 212, for managing a combined memory space 402 (refer to FIG. 4) formed by all of the NAND modules 222 in the SSD (i.e. the cumulative memory sizes of the NAND modules 222). Accordingly, the modules are a Space Management and Allocation module 302, a Workload Classification module 304, and a Two-level Address Mapping module 306. It is to be appreciated that the modules 302, 304, 306 are configured to work in tandem for managing the combined memory space 402, which is further subdivided into page address mapping zones 308 (each comprising a plurality of random data subsequently after data is stored), and block address mapping zones 310 (each comprising a plurality of sequential data subsequently after data is stored). The page address mapping zone (i.e. page zone) 308 and block address mapping zone (i.e. block zone) 310 are to be elaborated in later part of the description herein.

Furthermore, the modules 302, 304, 306 implement (on a firmware level) different sub-methods that are incorporated into and essential for the proper operation of Z-Map 300. The different sub-methods are namely: (1a). Zoning, (1b). Two-Level Address Mapping, (1c). Endurance-Aware Zone Allocation, and (1d). Buffer Zone and Workload Classification. In particular, the Space Management and Allocation module 302 implements sub-methods (1a) and (1c), while the Workload Classification module 304 implements sub-method (1d), and the Two-level Address Mapping module 306 implements sub-method (1b). Each sub-method is elaborated below.

(1a). Zoning

Figure 4:
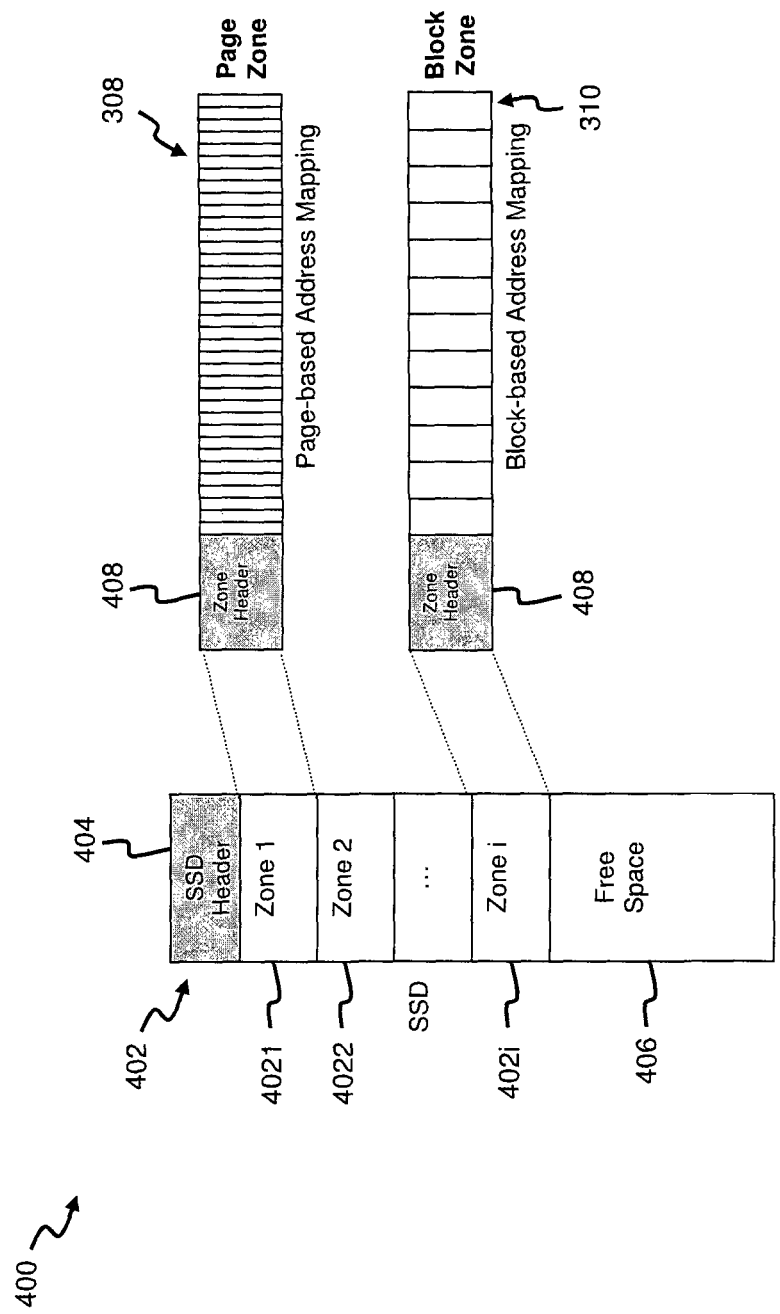
FIG. 4 illustrates a zone-based address mapping method, incorporated into the method of FIG. 3, for creating multiple memory zones in a memory of a SSD.

FIG. 4 illustrates a zone-based address mapping method 400 for creating multiple memory zones in the memory space 402 of the SSD to facilitate memory management. Firstly, the memory space 402 of the SSD is partitioned into multiple memory zones 4021, 4022 ... 402$i$, each of which is configured with a uniform and consistent size, as shown in FIG. 4. The memory zones 4021, 4022 ... 402$i$ are also known as data zones, since they store data. The memory space 402 of the SSD also includes a SSD management header 404, and (non-utilised) free space 406. It is also to be noted that Z-Map 300 is designed and configured such that random write and sequential write operations are stored in different memory zones 4021, 4022 ... 402$i$. The SSD management header 404 comprises metadata pertaining to the maintenance of information for the SSD (e.g. how free space are allocated between the partitioned memory zones 4021, 4022 ... 402$i$), and is not usually accessible by a typical user of the host system 202, under normal system access privileges.

A Referring now to the series of memory zones 4021, 4022 ... 402$i$, each memory zone 4021, 4022 ... 402$i$ is configured as either a page zone 308 or a block zone 310 for managing the data stored within, and also includes a zone management header 408 to maintain information about each memory zone 4021, 4022 ... 402$i$ (e.g. the memory zone type), as well as to keep track of the remaining free memory space within each memory zone 4021, 4022 ... 402$i$. Therefore, each memory zone 4021, 4022 ... 402$i$ functions independently in the sense that each memory zone 4021, 4022 ... 402$i$ is independently configurable with respect to the other memory zones 4021, 4022 ... 402$i$. In addition, Z-Map 300 is also configured to support parallel access and management among multiple zones.

According to this embodiment, small-sized random data are stored in page zones 308, whereas large-sized sequential data are stored in block zones 310. Furthermore, a page zone 308 or block zone 310 is allocated on-demand from the free space 406 of the memory space 402 of the SSD. More specifically, Z-Map 300 is configured to ensure that at any one time, there is an active block zone 310 and an active page zone 308 in which newly received data are written into and stored on. As for the reading of data in response to a read-request from the host system 202, the required data is retrieved from either existing zones or the active zones depending where the data is stored. When the free space available on the active block/page zones 310, 308 approaches a threshold value, a new zone is then allocated accordingly from the free space 406 of the memory space 402 of the SSD, and thereafter formatted as a next new active block or page zone 310, 308 by initializing the mapping table.

(1b). Two-Level Address Mapping

Figure 5:
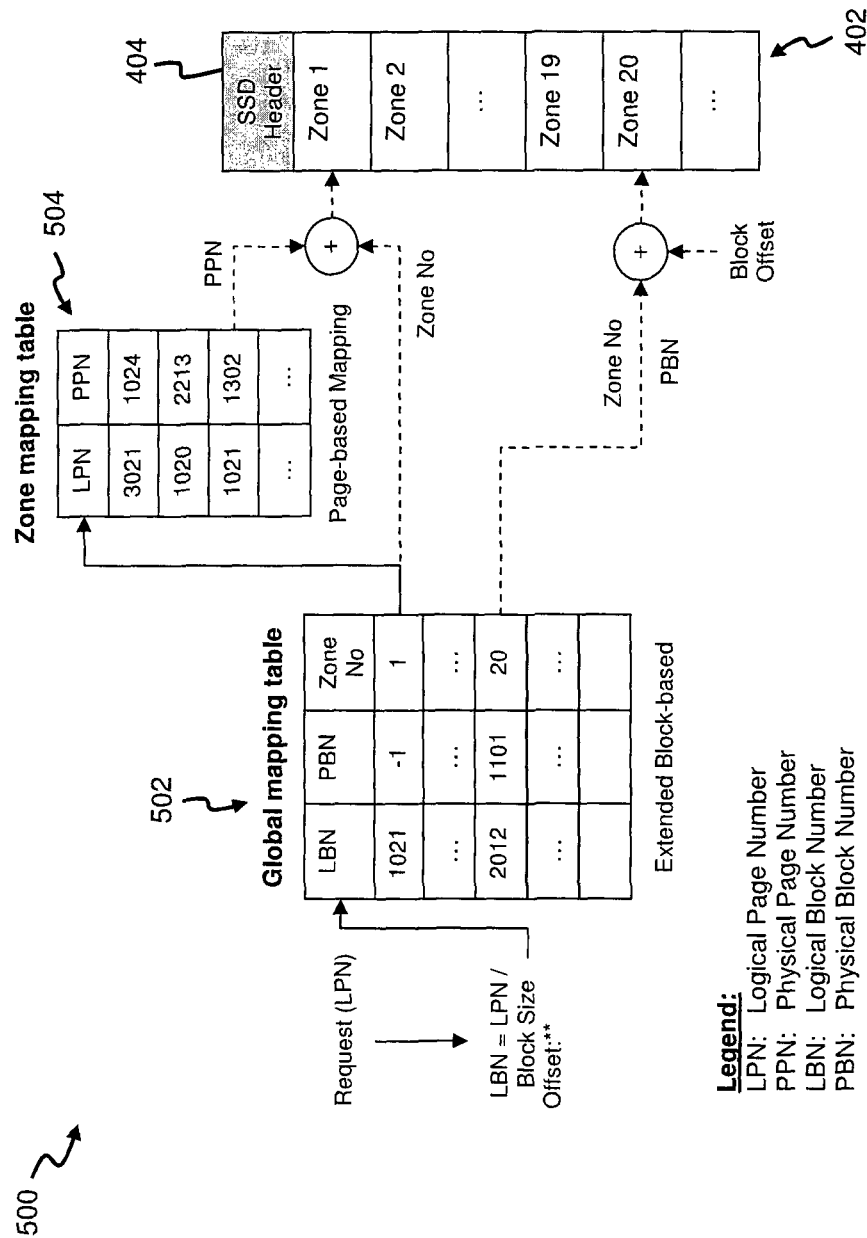
FIG. 5 illustrates a two-level address mapping method, incorporated into the method of FIG. 3, for the multiple memory zones of FIG. 4.

Next, FIG. 5 illustrates a two-level address mapping method 500, which is also incorporated into Z-Map 300. In order to implement Z-Map 300, a two-level address map is adopted, which includes using a Global Mapping Table 502 and multiple Zone Mapping Tables 504 to perform (memory) address mapping. To reduce the sizes of the mapping tables 502, 504, an extended block-based mapping technique was used for the Global Mapping Table 502, which involves maintaining the mapping among or between corresponding logical block numbers, physical block numbers and zone numbers. Specifically in this embodiment, the physical block number is set to "−1" for indicating the presence of page zones 308 in the Global Mapping Table 502. On the other hand, block zones 310 are directly addressable by the Global Mapping Table 502. With respect to the Zone Mapping Tables 504, each is configured to be maintained for only page zones 308, and therefore accordingly utilises page-based address mapping as described afore.

To locate any data stored in the memory space 402, which are requested by the host system 202, the following sequential steps are performed:

(i). With the receipt of a request, which includes an embedded logical page number, the corresponding logical block number and block offset are calculated based on the logical page number. Further, an associated zone number is obtained by searching the Global Mapping Table 502 using the prior calculated logical block number;

(ii). If the corresponding physical block number (which is calculated based on the logical page number) is less than zero, the physical page number is then obtained by searching the Zone Mapping Tables 504 using the logical page number. Thereafter, with the zone number and physical page number, the request is then servable in terms of enabling retrieval of the required data from the appropriate memory location in the memory space 402; and (iii). If the corresponding physical block number is, however, determined to be larger than zero, the required data are then directly accessible using the zone number, physical block number and block offset.

It is to be appreciated that the two-level address mapping method 500 therefore effectively reduces the sizes of the mapping tables 502, 504, and by using the physical block number to indicate the zone type (i.e. a positive value indicates a page zone 308, and a "−1" indicates a block zone 310), searching and locating of data within the memory space 402 is made more efficient. It is also to be highlighted that if the data is located in a block zone 310, no further search is then required, whereas if the data is located in a page zone 308, then the Zone Mapping Table 504 is searched to obtain an associated physical page number.

It is to be appreciated that the Global Mapping Table 502 is configured to be always fully loaded into the working memory of the SSD, and the Zone Mapping Tables 504 are configured to be partially loaded into the working memory depending on the size of the working memory. Nonetheless, if the working memory is sufficiently large, all of the Zone Mapping Tables 504 are then loadable into the working memory. However, if the working memory is restricted in size, only the most recently accessed Zone Mapping Tables 504 are then kept in the working memory. When replacement is to be performed, a Least Recently Used (LRU) approach is then used to select a victim Zone Mapping Table 504.

(1c). Endurance-Aware Zone Allocation

Figure 6:
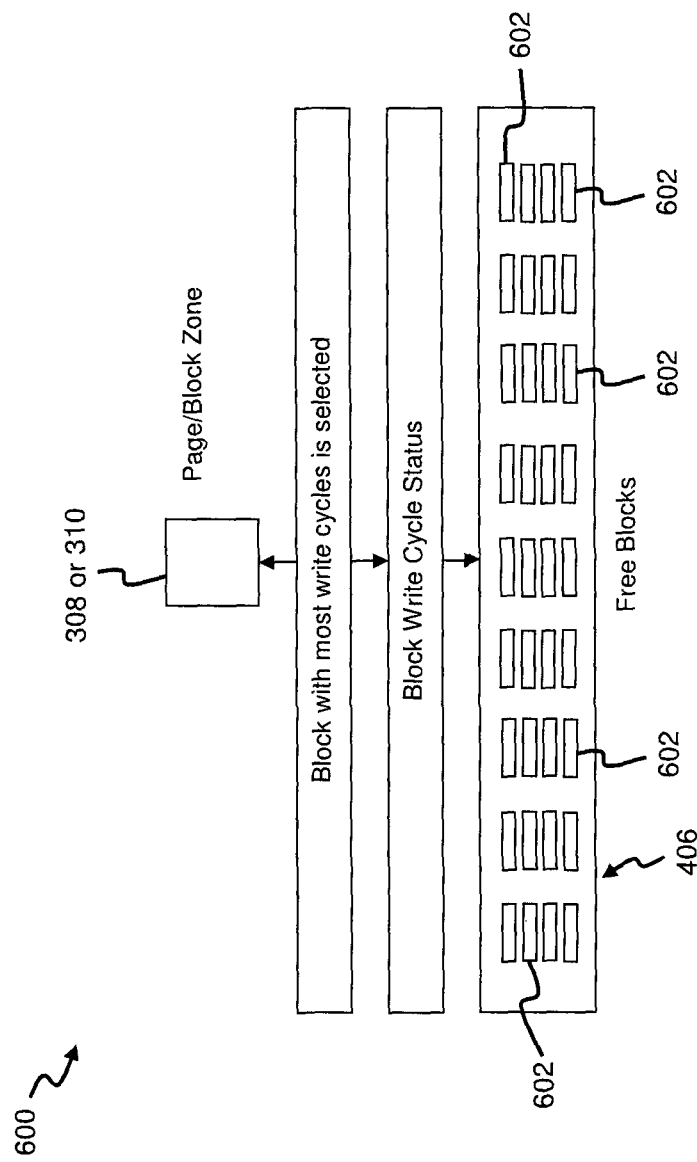
FIG. 6 illustrates how the different types of memory zones in FIG. 4 are dynamically allocated or created.

FIG. 6 then shows an endurance-aware zone allocation method 600, which is responsible for how the different types of memory zones 4021, 4022 ... 402$i$ are dynamically allocated or created. As known to skilled persons, NAND flash memory typically allow only a finite number of erases for a given physical memory block due to the nature of the technology. For example, a typical Multi-Level Cell (MLC) flash memory has around 10,000 to 30,000 erase cycles, while a Single-Level Cell (SLC) flash memory has around 100,000 to 300,000 erase cycles. Therefore, it is to be appreciated that free block allocation is critical to maximising the operational lifetime of a SSD. If each memory block is randomly allocated, certain memory blocks consequently are frequently overwritten and hence tend to wear out/degrade earlier than other memory blocks, which relatively do not get utilised as frequently. Therefore, based on the above knowledge and concept, the endurance-aware zone allocation method 600 is is designed and configured to ensure that equal use is made of all the write cycles available to each memory block. More specifically, the write cycles of each memory block are used to maintain the remaining amount of write cycles left before a particular memory block wears out (i.e. by using a variable to record the remaining write cycles left for each memory block). Any free memory blocks 602 residing in the free space 406 are then indexed using the write cycle. Thereafter, free memory blocks having the greatest amount of remaining write cycles are then selected when a new page zone 308 or block zone 310 is to be subsequently allocated.

(1d). Buffer Zone and Workload Classification

Figure 7:
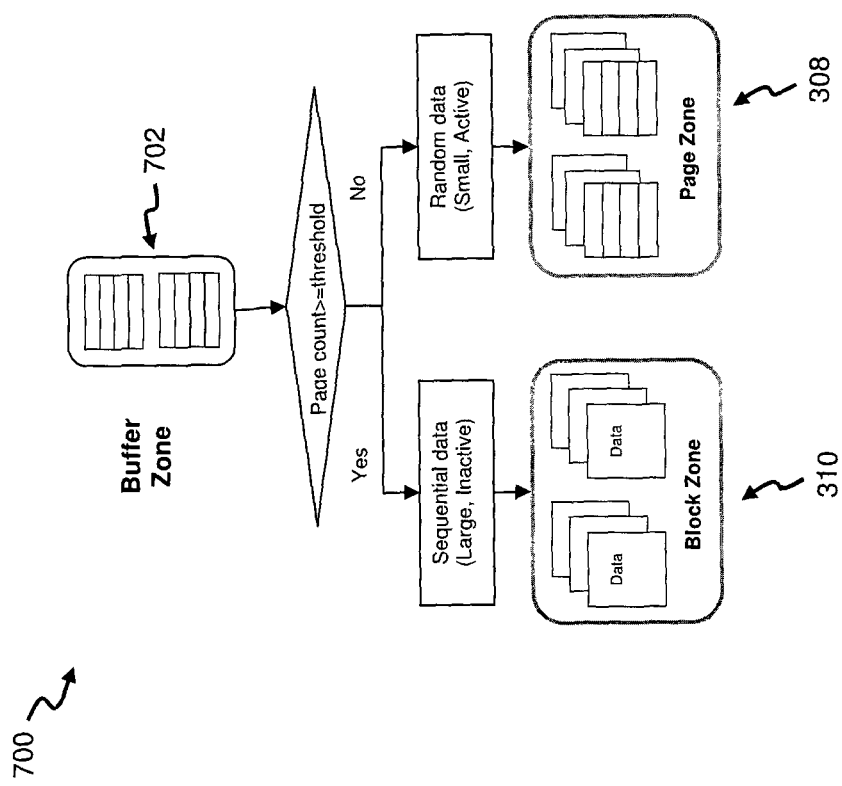
FIG. 7 illustrates a buffer zone and workload classification method, incorporated into the method of FIG. 3.

With respect to FIG. 7, a buffer zone and workload classification method 700 is illustrated. In detail, Z-MAP 300 explores a small part of the memory space 402 to be used as a Buffer Zone 702 in order to improve the (data) writing performance and for classifying workload. It is to be appreciated that workload classification is performed during data migration: sequential data are stored into block zones 310 while random data are stored into page zones 308. A criterion used for determining whether the received data (being currently stored in the Buffer Zone 702) is sequential or random in nature is to check whether the following condition is satisfied: "Page count>=Threshold". In this context, the "Page count" parameter refers to the number of occupied pages in a memory block 602. For example, if a memory block 602 is configured to store "64" number of pages, and the number of occupied pages at a specific instance is "35", then the "Page count" value is equivalent to "35". On the other hand, the "Threshold" parameter refers to the allocated size of the block 602. For example, if a memory block 602 is configured to store "64" number of pages, the "Threshold" then has a value of "64". It is to be further appreciated that the "Threshold" parameter is adjustable according to the workload being classified. If the condition is fulfilled (i.e. the decision box branches to "Yes"), then the received data is considered sequential in nature and thus stored into block zones 310, whereas if the condition is not fulfilled (i.e. the decision box branches to "No"), the received data is deemed to be random in nature and thus stored into page zones 308. Therefore, applying the above example where "Page count" and "Threshold" take on the values of "64" and "35" respectively, the condition then is not fulfilled since "Page count<Threshold" (i.e. 35<64), implying that the data is treated as random data and to be stored into the page zones 308. Additionally, the Buffer Zone 702 consists of several hundreds of memory blocks, and any write or update operation is sequentially logged into the Buffer Zone 702. Moreover, valid data already stored in the Buffer Zone 702 are moved into data zones (i.e. the block or page zones 310, 308) only when the Buffer Zone 702 has no free space left (i.e. is full).

The use of the Buffer Zone 702 within the memory space 402 offers advantages including by temporarily storing write requests in the Buffer Zone 702 until to the point when no remaining free space is available, it provides more knowledge and opportunities to efficiently classify the workload even before the data are permanently stored in the memory space 402 of the SSD. Moreover, the Buffer Zone 702 facilitates reshaping of data accessing streams so that random writes are reduced and more sequential writes are generated through absorbing repeated updates of hot data (i.e. frequently accessed data), and reconstructing interleaved write operations back to sequential write operations.

Accordingly, Z-Map 300 is then evaluated via simulations using the following experimental setup, the details of which are provided below.

(2a). Experimental Setup (i). Trace-Driven Simulator

A trace-driven simulator loaded with algorithms of different address mapping schemes including Page-based FTL, Demand-based Flash Translation Layer (DTFL), Fully Associative Sector Translation (FAST), and Z-Map 300 (of the present embodiment) for benchmarking them against one another is adopted. Accordingly, FIG. 8 shows a table 800 presenting the respective configuration parameters of a simulated SSD used in simulations to benchmark Z-Map 300 against the rest of the other types of address mapping schemes.

(ii). Workload Traces

In addition, various types of workload were used to extensively evaluate Z-Map 300. In this respect, a set of real-world traces is used to study the efficiency of the different address mapping schemes versus Z-Map 300 on a wide spectrum of enterprise-level workloads. Accordingly, FIG. 9 also shows another table 900 of the respective configuration parameters characterising the salient features of different types of workload used in the simulations.

(iii). Evaluation Metrics

The following parameters are used as metrics for the evaluation of the simulation results: (i). average response time, (ii). erase count (i.e. indicators of the garbage collection overhead), and (iii). size of mapping table. Collectively, these parameters provide information to characterise the behaviour and performance of the different address mapping schemes being studied via the simulations.

(2b). Evaluation Results

Figure 10:
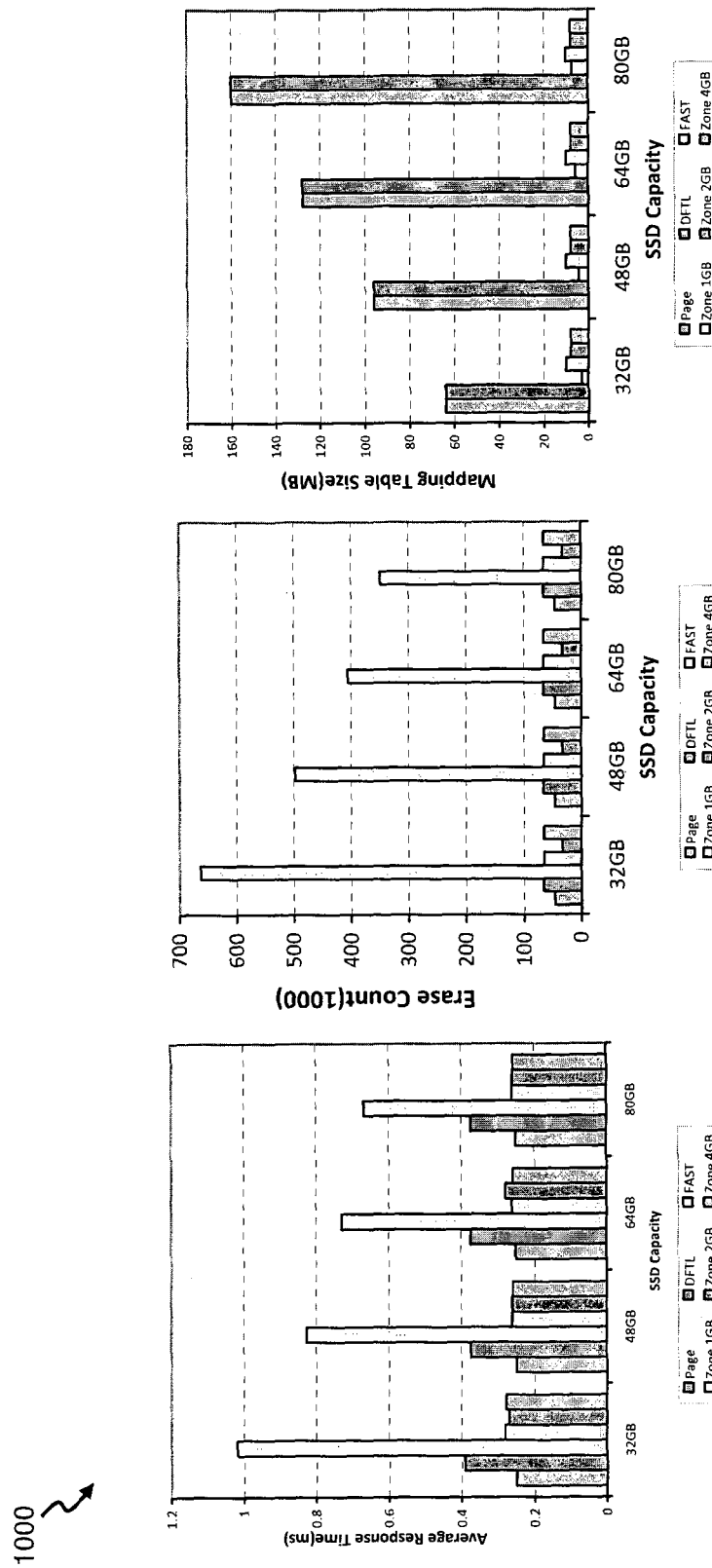
FIGS. 10 to 13 are graphs depicting evaluation benchmark results obtained from the simulations of FIG. 8.
Figure 11:
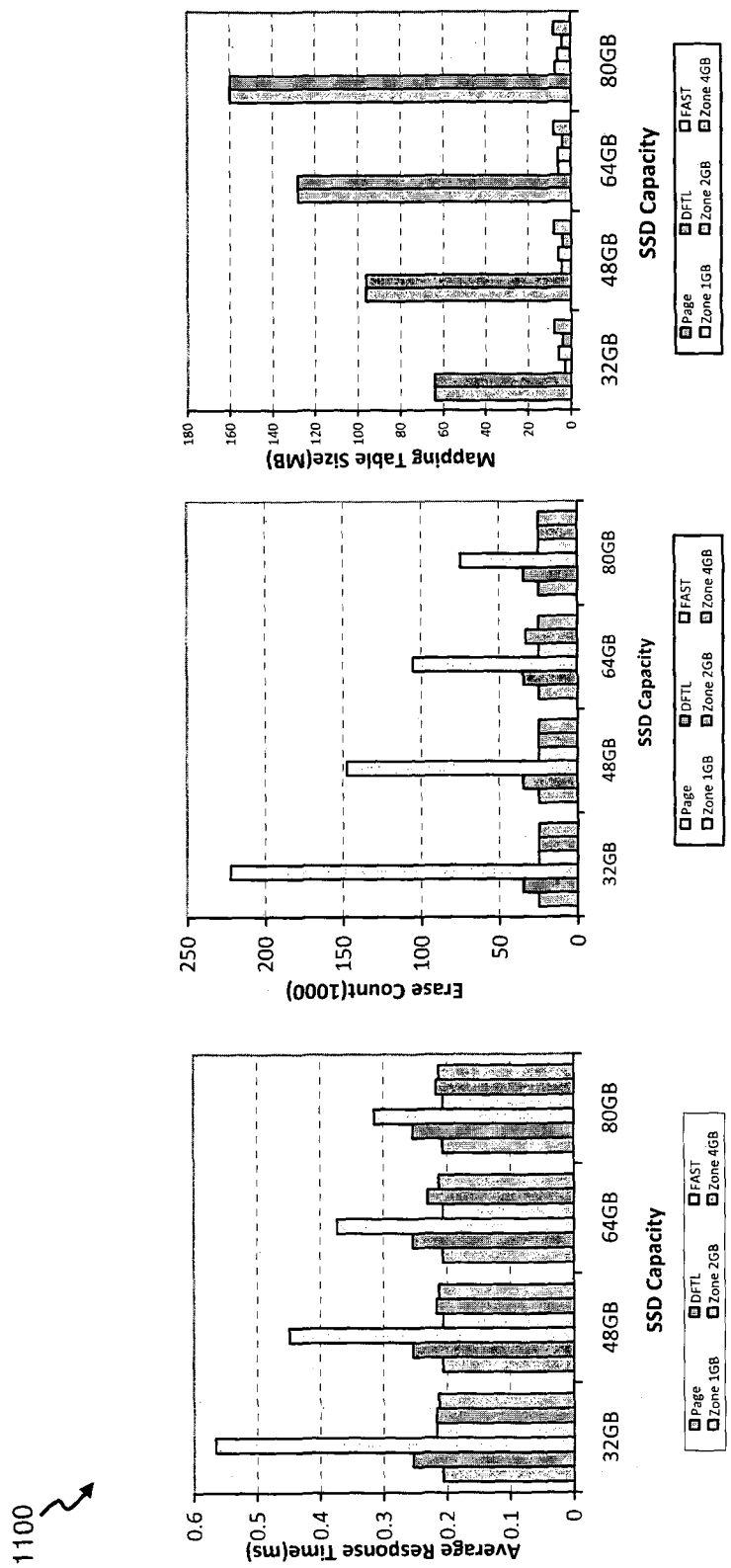
Figure 12:
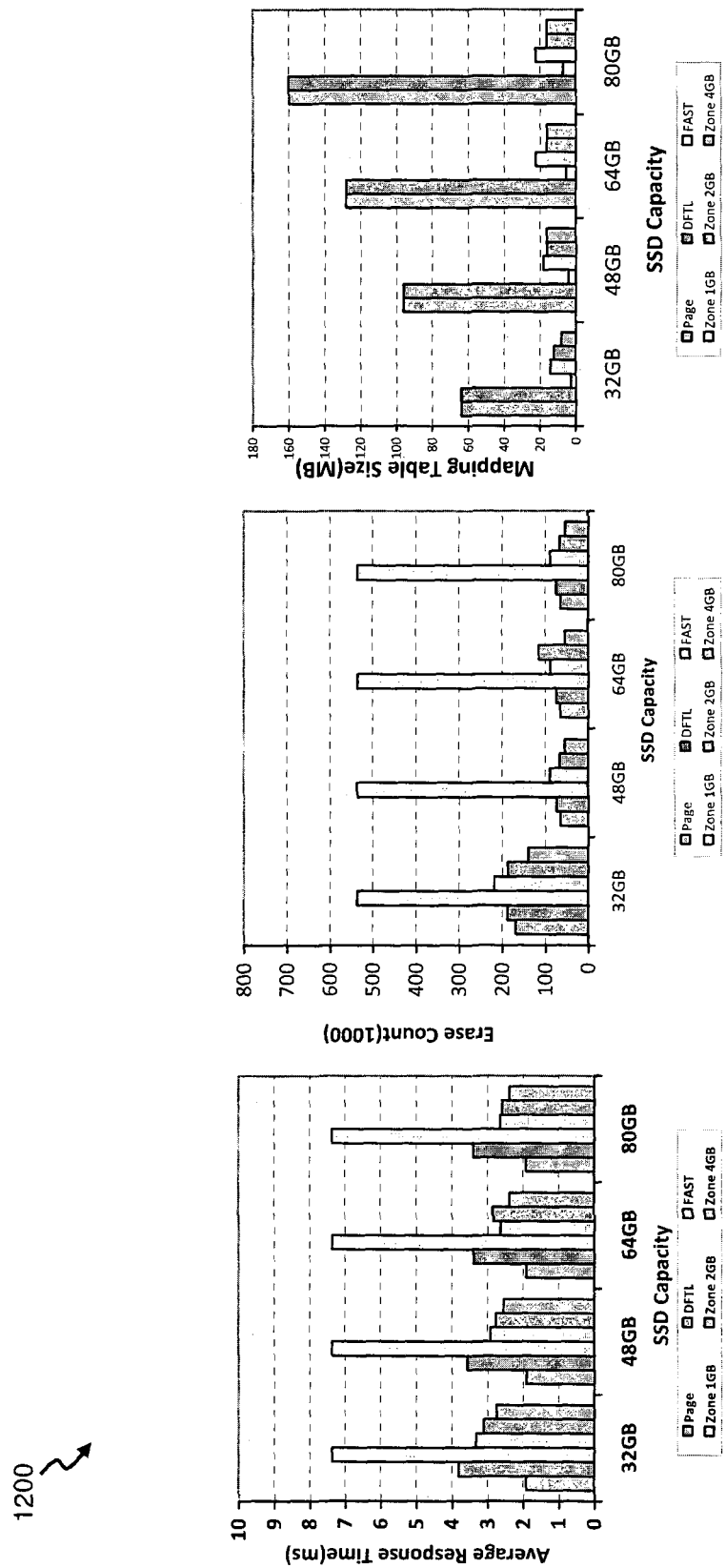
Figure 13:
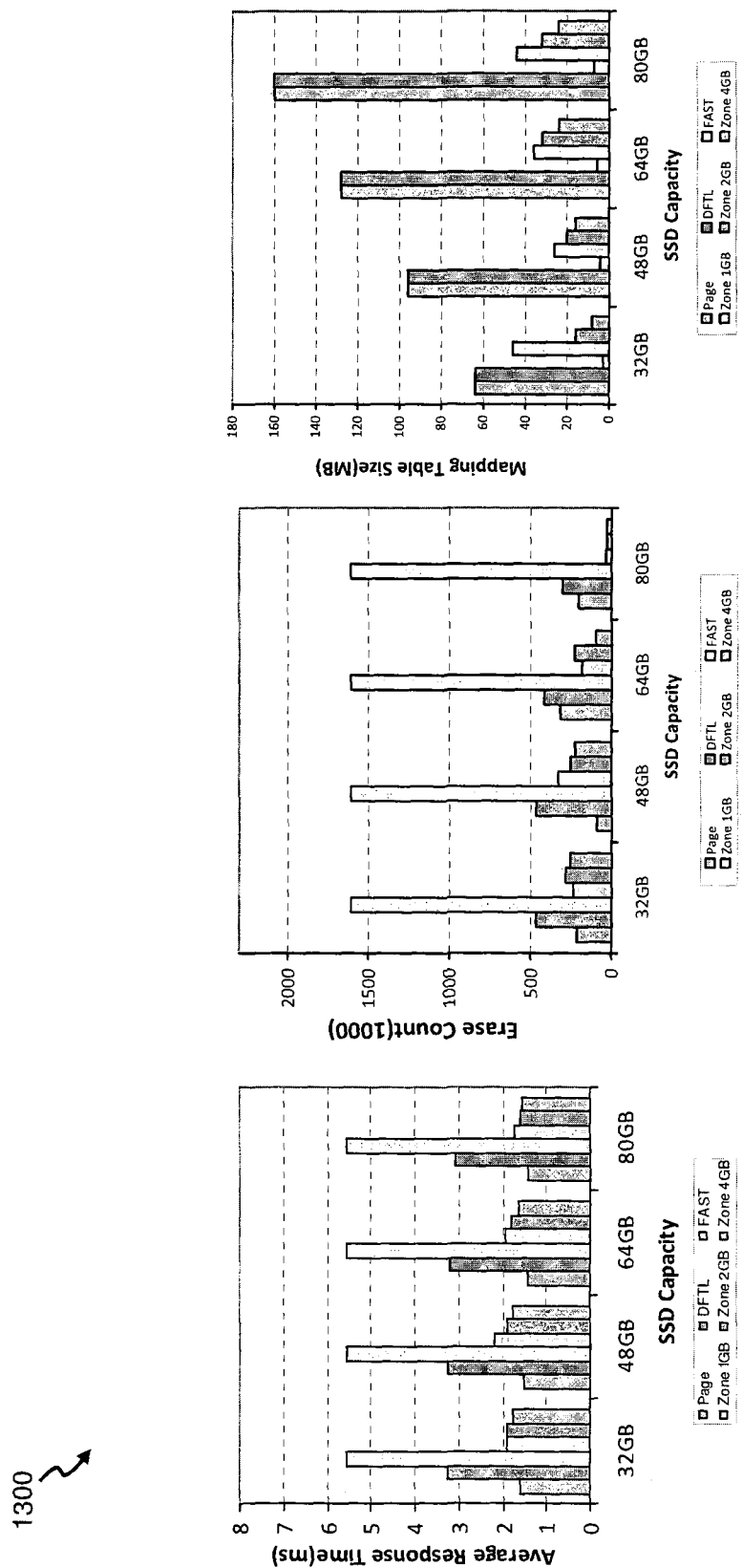

Following on, FIG. 10 through to 13 are graphs 1000, 1100, 1200, 1300 depicting the evaluation (benchmark) results obtained from the simulations performed using the trace-driven simulator as described in section (2a)(i). In particular, the graphs 1000, 1100, 1200, 1300 provide graphical information relating to (i). average response time, (ii). erase count, and (iii). size of the mapping table of the different address mapping schemes in response to the workload traces being employed, when the capacity of the simulated SSD is varied. It is to be appreciated that the benchmark results, as depicted in the graphs 1000, 1100, 1200, 1300, demonstrate that the zone-based address mapping method 400 of Z-Map 300 is able to achieve a performance improvement of up to 78% (in terms of average response time), a number of erase reduction of up to 40%, and a size reduction of the mapping table of up to 78%.

(2c.) Workload Adaptive

Figure 14:
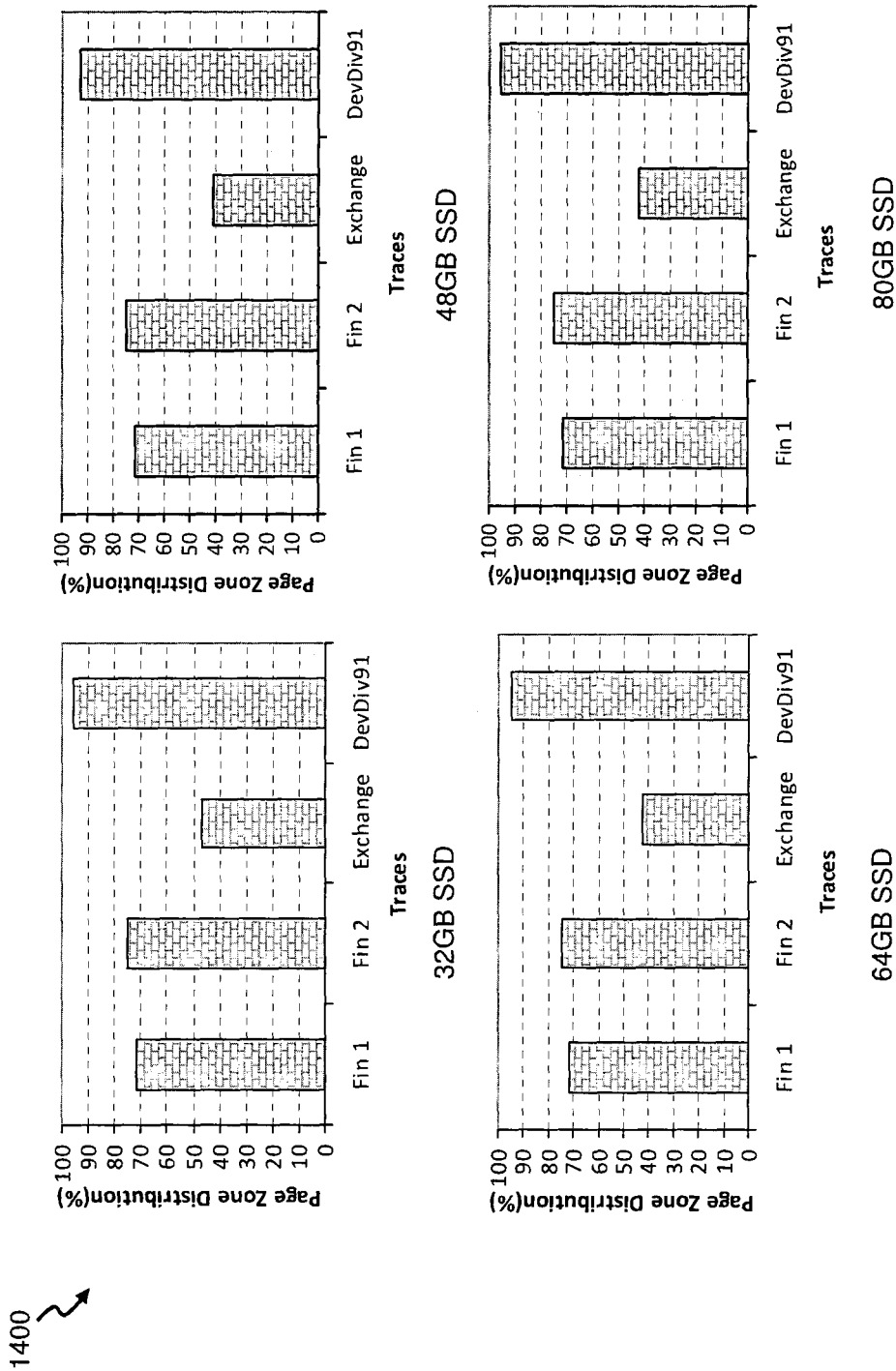
FIG. 14 are graphs showing the percentage of page-zone distribution across different types of workload for SDDs of various size capacities.

FIG. 14 are graphs 1400 showing the percentage of page-zone distribution across different types of workload, with reference to FIG. 9, for SDDs of various size capacities (i.e. 32 GB, 48 GB, 64 GB, and 80 GB respectively). Particularly, the results in the graphs 1400 indicate that the number of page zones 308 varies with changing workload. This is because different types of workload are characterised by different number/amount of page zones 308 and block zones 310. More specifically, random intensive workload is characterised with more page zones 308, while sequential intensive workload conversely has more block zones 310. It is then to be appreciated that Z-Map 300, based on the current embodiment, advantageously achieves high performance by efficiently adapting to different types of workloads via the use of on-demand Zone Allocation and flexible address mapping.

Figure 15:
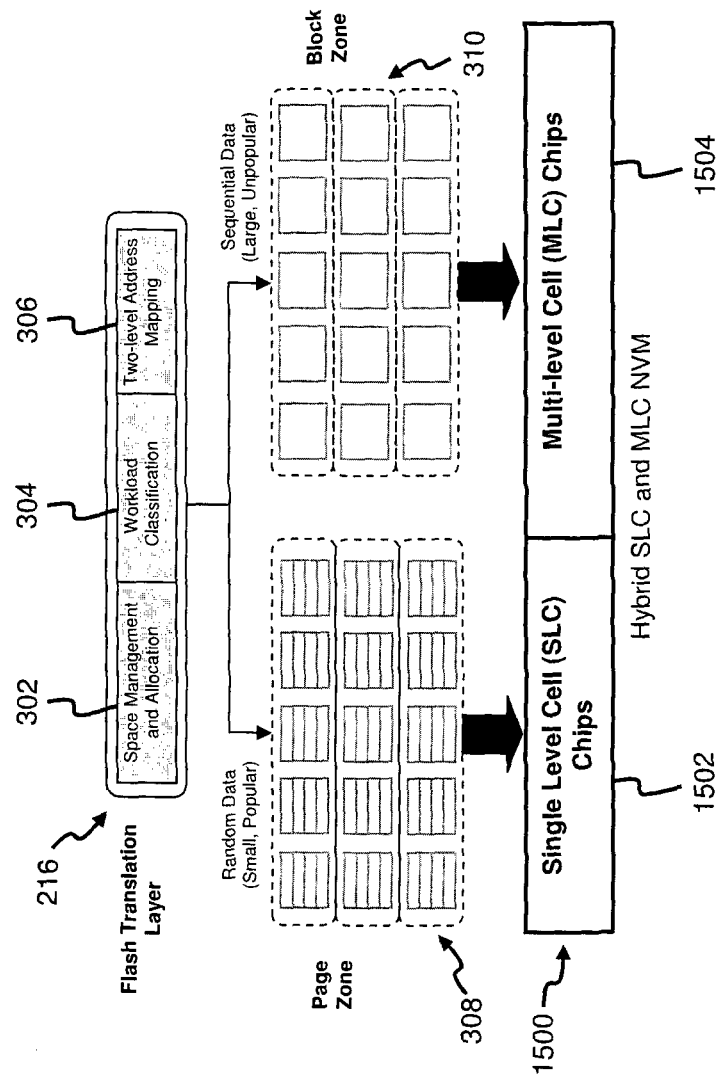
FIG. 15 illustrates application of the method of FIG. 3 to hybrid Non-volatile memory (NVM) comprising Single-level Cell (SLC) chips, and Multi-level Cell (MLC) chips.
Figure 16:
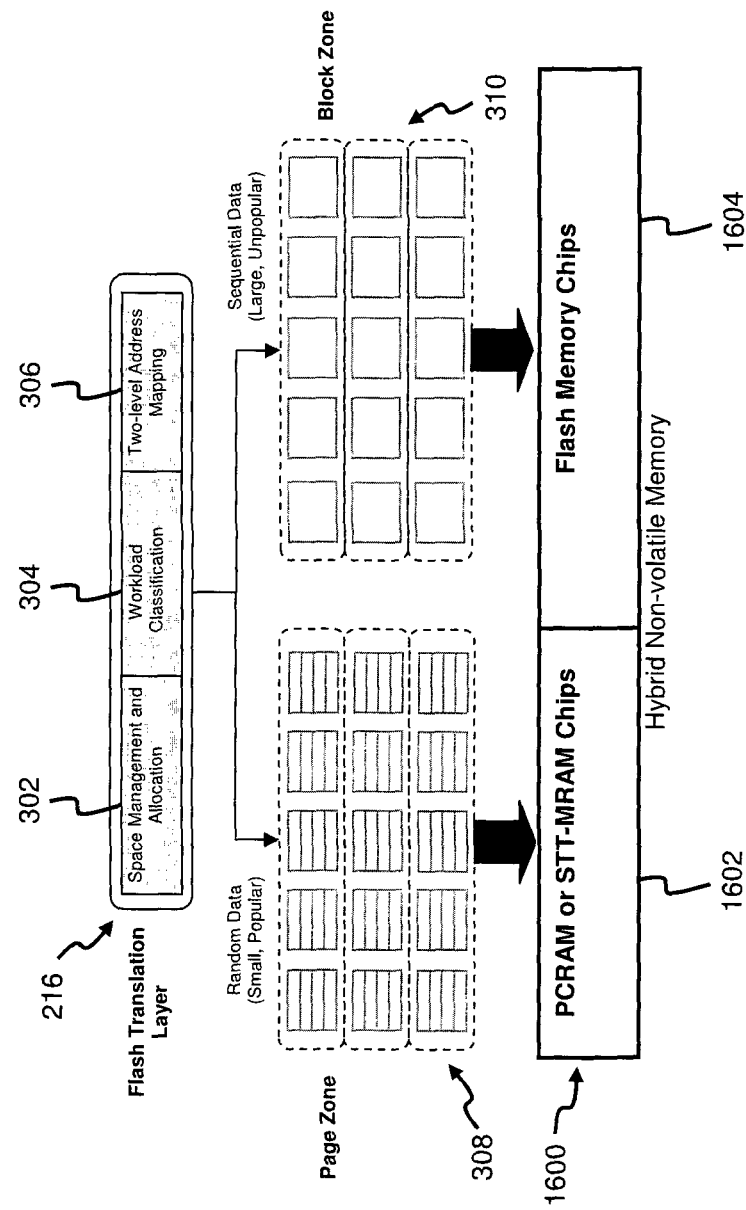
FIG. 16 illustrates application of the method of FIG. 3 to hybrid Non-volatile memory (NVM) comprising PCM/STT-MRAM, and Flash memory chips.
Figure 17:
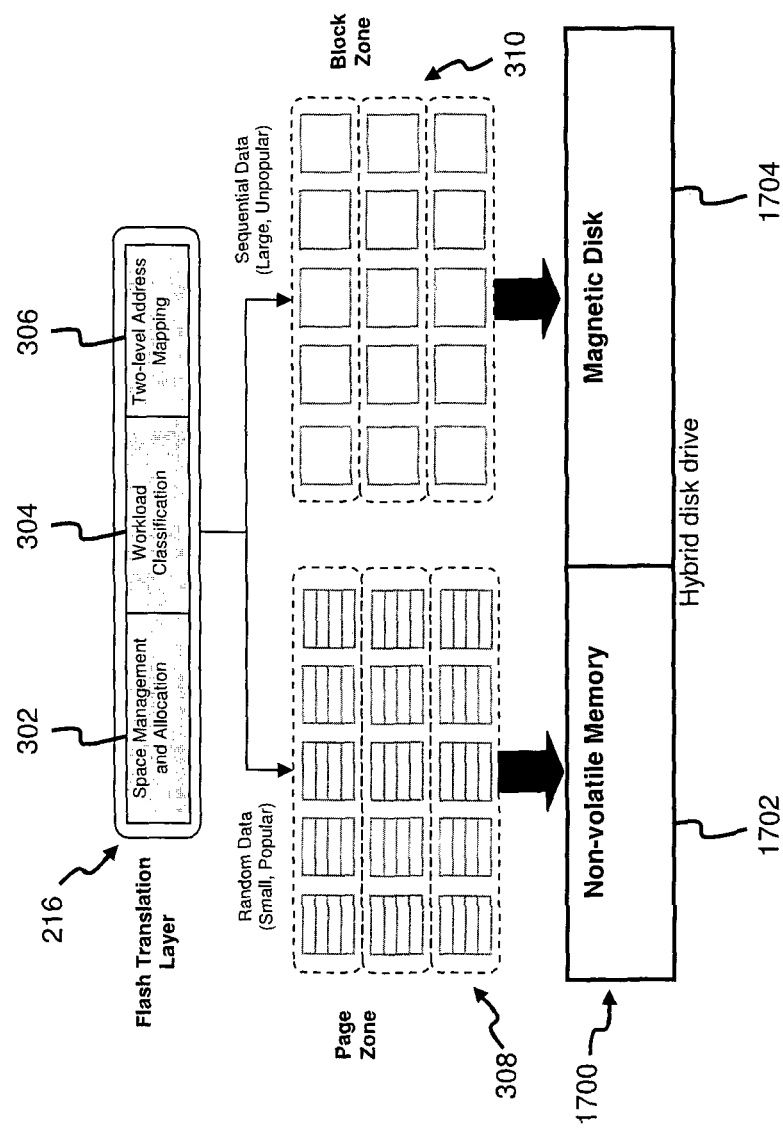
FIG. 17 illustrates application of the method of FIG. 3 to a hybrid disk drive comprising Non-volatile memory (NVM), and a magnetic disk.

FIG. 15 then illustrates application of Z-Map 300 to a first hybrid Non-volatile memory (NVM) 1500 comprising Single-level Cell (SLC) chips 1502, and Multi-level Cell (MLC) chips 1504. Next, FIG. 16 illustrates application of Z-Map 300 to a second hybrid Non-volatile memory (NVM) 1600 comprising PCM/STT-MRAM 1602, and Flash memory chips 1604. Lastly, FIG. 17 illustrates corresponding application of Z-Map 300 to a hybrid disk drive 1700 comprising Non-volatile memory (NVM) 1702, and a magnetic disk 1704. It is also to be appreciated that the NVM 1702 may be the first NVM 1500 of FIG. 15 or the second NVM 1600 of FIG. 16.

Advantages to Z-Map 300 of the second embodiment include maintaining corresponding mapping tables only for memory zones 4021, 4022 ... 402i currently being utilised for data storage, while existing FTL schemes in contrast always pre-allocate a mapping table for the entire memory space in a SSD. In other words, for Z-Map 300, a mapping table for a particular memory zone 4021, 4022 ... 402i is created only when that memory zone 4021, 4022 ... 402i is allocated in response to a demand.

Additionally, the existing FTL schemes are static; in other words the corresponding mapping methods are already fixed and cannot be changed, while Z-Map 300 in comparison enables formulation of a memory layout based on the afore described Zoning concept to provide a flexible mapping method. More specifically, during execution of data operations, use of page-based or block-based address mapping for a memory zone 4021, 4022 ... 402i is dynamically determined by Z-Map 300 only during allocation phase, since the peculiar characteristics of different workload types demand allocation of different number of page zones 308 and block zones 310. In particular, Z-Map 300 is configured to assign more block zones 310 for sequential-intensive workload environments, and to conversely provide more page zones 308 for random-intensive workload environments. Accordingly, Z-Map 300 hence advantageously allows implementation of an adaptive FTL which dynamically functions and reacts based on the workload nature.

Another advantage of Z-Map 300 is due to its adaptive characteristic, which is considered to be a two stage process comprising: (a). an initial adaptation which sends data to page zones 308 or block zones 310 in response to after determining whether the received data is random or sequential, and (b). a structure adaptation which assigns the memory zones as page zones 308 or block zones 310 in response to the received data. As already described afore, Z-Map 300 classifies and stores random data into page zones 308 and sequential data into block zones 310. Since a specific zone is allocated on-demand, it implies that the zone is adaptively configurable as a page zone 308 or block zone 310 with reference to a workload type. A workload dominated by random write operations will have more page zones 308, whereas one dominated by sequential write operations will have more block zones 310. Accordingly, Z-Map 300 is thus indeed considered to be workload adaptive.

Additionally, Z-Map 300 also improves on scalability as a result of reducing the amount of small random writes required. It is known to skilled persons that data management overhead is becoming a serious issue with the increase in storage capacity of SSD from the region of Gigabytes to Terabytes. Therefore, from the outset of conceptualising Z-Map 300, the important consideration of enabling data management to be scalable with (or independent of) the storage capacity was taken into account.

In respect of this, Z-Map 300, as described in the second embodiment, manages the memory space 402 in units of memory zones 4021, 4022 ... 402i, rather than as pages or blocks. Using a memory zone 4021, 4022 ... 402i as the basic management and mapping unit, it then becomes a possible task to significantly reduce the size of the data structure and mapping tables. In other words, the overheads incurred due to use of the zone-based address mapping method 400 then do not increase linearly with the storage capacity of the SSD, hence enabling Z-Map 300 to be scalable for managing SSDs of very large capacities.

Furthermore, contrary to existing FTL schemes where random write operations generally tend to spread over the whole memory space 402 of the SSD, the zone-based address mapping method 400 used by Z-Map 300 helps to reduce the randomness of small write operations, and therefore allows data management of such data access patterns to be more performance effective in terms of minimising fragmentation, garbage collection overhead, block erase, and extending the operational lifetime of the SSD.

In summary, due to the trend of increasing storage capacities available on flash-based SSD, the problem of efficiently managing those storage capacities in a scalable manner is becoming a challenge. Existing FTL algorithms including page-based FTL, Block-based FTL, and Hybrid FTL have inevitable limitations, in terms of memory requirement, performance, garbage collection overhead, and scalability. To address these limitations, Z-Map 300, as proposed in the second embodiment, particularly divides the memory space 402 of the SSD into multiple memory zones 4021, 4022 ... 402i. Specifically, each memory zone 4021, 4022 ... 402i functions independently and dynamically adopts either page-based address mapping or block-based address mapping. A memory zone 4021, 4022 ... 402i utilising page-based address mapping is called a page zone 308, and a zone using block-based address mapping is called block zone 310. Page zones 308 or block zones 310 are allocated based on demand and the address mapping method used in a memory (or data) zone is determined by the nature of the workload of an application environment. Furthermore, in leveraging the locality of data access, sequential large-sized data are then written into the block zones 310 and random small-sized data are then written into the page zones 308. Therefore, Z-Map 300, when compared to existing SSD FTL schemes, advantageously enables higher performance, efficiently uses smaller-sized mapping tables, results in less garbage collection overhead, is scalable, and lastly is workload adaptive.

Moreover, it is to be highlighted that Z-Map 300 has been extensively evaluated under various type of enterprise-level workloads, and the benchmark results favourably demonstrate that Z-Map 300, relative to existing schemes, is able to achieve up to 78% of performance improvement, 78% of mapping table size reduction, 40% of garbage collection overhead reduction, and 82% of energy saving compared to existing address mapping schemes.

Therefore, with an appreciation of the workings of Z-Map 300 as afore described, the following list may then be considered as preferred features of Z-Map 300:

(1). The SSD memory space 402 is divided into multiple memory zones 4021, 4022 ... 402i. Each memory zone 4021, 4022 ... 402i follows either a uniform or a variable allocation (i.e. in terms of the number of memory blocks being allocated within), and is configured with its own mapping table and functions independently. For example, a page zone 308 and a block zone 310 are each allocated with "1024" number of memory blocks (i.e. uniform allocation), or alternatively a page zone 308 is allocated with "512" number of memory blocks, whereas a block zone 310 is instead allocated with "1024" number of memory blocks (i.e. variable allocation);

(2). Each memory zone 4021, 4022 ... 402i is dynamically allocated on demand: a new block/page zone 310, 308 is allocated only when insufficient free space is detected in the current active block/page zone 310, 308;

(3). Two-level address mapping: an extended block-based address Global Mapping Table 502 and a plurality of page-based Zone Mapping Tables 504 are used for address mapping in order to achieve high performance with an advantage of allowing the use of small mapping tables;

(4). Locality-aware data partition/placement: sequential data are stored in the block zones 310 and random data are stored into the page zones 308;

(5). Workload adaptive: the number of page zones 308 and block zones 310 being allocated eventually is dependant on the nature of the workload being managed. Particularly, different types of workload require allocation of different number of page zones 308 and block zones 310. Sequential intensive workload is likely to result in more block zones 310 being assigned while random intensive workload on the other hand results in more page zones 308; and (6). Z-Map 300 is a scalable scheme because a size of the allocated mapping table is entirely independent of the capacity of the SSD, on which Z-Map 300 is deployed. In contrast, the size of conventional page-based mapping table increases linearly as the capacity of the SSD grows.

The described embodiments should not however be construed to be limitative. For example, the described second embodiment lists the SSD as an example of a storage medium in which Z-Map 300 is utilised, but it is also envisaged that Z-Map 300 may also be applicable to other types of storage devices such as non-volatile memory card. In addition, Z-Map 300 is employable for storages devices configured with volatile memory. More broadly speaking, Z-Map 300 may be implemented in any flash memory device which requires scalable block management and address mapping.

Furthermore, the sizes of the memory zones partitioned from the memory space 402 of the SSD may be uniform or non-uniform (i.e. variable) and is not confined to a predefined static configuration. More specifically, according to a first method, in which the storage/memory space Of the SSD is partitioned into memory zones of uniform size (e.g. 1 Gigabytes/per zone) when the current page-based/block-based memory zone is determined to be full, a new memory zone is consequently dynamically allocated on demand. The number of either zone being allocated is different for different types of workload; that is, a workload dominated by random write operations is likely to result in more page zones 308 being allocated, while a workload dominated by sequential write operations is likely to have more block zones 310 being assigned.

Yet further, according to an associated second method, in which the storage/memory space of the SSD is otherwise partitioned into memory zones of variable size, the SSD (or the memory controller 220) may maintain, for example, only two types of memory zones: page zones 308 and block zones 310, which may be dynamically extended as the demand for more free space arises. The size of each memory zone is different for different types of workload, that is, a workload dominated by random write operations is likely to have a bigger page zone 308, while a workload with sequential write operations conversely may have a bigger block zone 310. It is to be appreciated that the memory space 402 in the SSD is chiefly classified into two areas: areas occupied by data and those available as free space, from which a page zone 308 or block zone 310 is extended by allocating clean blocks from the free space. It is also to be highlighted that the two above described implementations of partitioning the SSD achieve the same effect; in other words both implementations still enable Z-Map 300 to be dynamic and workload adaptive.

While the invention has been illustrated and described in detail in the drawings and foregoing description, such illustration and description are to be considered illustrative or exemplary, and not restrictive; the invention is not limited to the disclosed embodiments. Other variations to the disclosed embodiments can be understood and effected by those skilled in the art in practising the claimed invention.

What is claimed is:

1. A storage device comprising:
   memory divisible into multiple zones, each zone comprising a plurality of physical blocks of the memory and for associating with a zone-based address map for mapping between logical and physical addresses of said zone,
   wherein the multiple zones are configurable independently of each other and wherein the storage device further comprises a Flash Translation Layer (FTL) configured to dynamically apply page-based address mapping or block-based address mapping for each zone.

2. A storage device according to claim 1, wherein the multiple zones are created dynamically.

3. A storage device according to claim 1, wherein the either page-based address mapping or block-based address mapping is applied depending on the type of data to be stored in the respective zone.

4. A storage device according to claim 3, wherein if the data to be stored is random data, the FTL is configured to store the random data based on page-based address mapping.

5. A storage device according to claim 3, wherein if the data to be stored is sequential data, the FTL is configured to store the sequential data based on block-based address mapping.

6. A storage device according to claim 1, wherein each zone is configurable with a same number of physical blocks of memory.

7. A storage device according to claim 1, wherein some of the zones have different numbers of physical blocks of memory.

8. A storage device according to claim 1, wherein the zone-based address map includes a global mapping table for mapping between logical block number and zone number for the multiple zones.

9. A storage device according to claim 8, wherein the global mapping table is further configured for mapping between logical blocks and physical blocks of memory for block zones.

10. A storage device according to claim 8, wherein the zone-based address map further includes a plurality of zone mapping tables for mapping between logical and physical pages of memory for page zones.

11. A storage device according to claim 10, wherein the storage device further includes a working memory and the entire global mapping table is fully loaded into the working memory.

12. A storage device according to claim 11, wherein the plurality of zone mapping tables are partially or fully loaded into the working memory in dependence on the size of the working memory.

13. A storage device according to claim 9, wherein the global mapping table includes a physical block number for representing an associated entry that is mapped to one of the plurality of zone mapping tables.

14. A storage device according to claim 10, wherein the physical block number is −1.

15. A storage device according to claim 10, wherein the storage device is arranged to receive an access request associated with a logical page number, and the storage device is further arranged to search the global mapping table to obtain a zone number of the multiple zones based on a calculated logical block number.

16. A storage device according to claim 15, wherein if the zone number corresponds to one of the page zones, the storage device is further arranged to search the zone mapping table of the corresponding zone to obtain a physical page number, and to deliver the request based on the zone number and the physical page number of the corresponding zone.

17. A storage device according to claim 15, wherein if the zone number corresponds to one of the block zones, the storage device is further arranged to obtain a physical block number directly from the global mapping table, and to deliver the request based on the zone number and the physical block number of the corresponding zone and a block offset.

18. A storage device according to claim 1, wherein the memory includes non-volatile or volatile memory.

19. A zone-based block management and address mapping method for a storage device including memory, the method comprising:
dividing the memory into multiple zones, each zone comprising a plurality of physical blocks of the memory; and
associating each zone with a zone-based address map for mapping between logical and physical addresses of said zone,
wherein the multiple zones are configurable independently of each other and wherein the method further comprises dynamically applying page-based address mapping or block-based address mapping for each zone.

20. A zone-based block management and address mapping method according to claim 19, further comprising dynamically creating the multiple zones.

21. A zone-based block management and address mapping method according to claim 19, wherein the either page-based address mapping or block-based address mapping is applied depending on the type of data to be stored in the respective zone.

22. A zone-based block management and address mapping method according to claim 21, wherein if the data to be stored is random data, the method comprises storing the random data based on page-based address mapping.

23. A zone-based block management and address mapping method according to claim 21, wherein if the data to be stored is sequential data, the method comprises storing the sequential data based on block-based address mapping.

24. A zone-based block management and address mapping method according to claim 19, further comprising configuring each zone with a same number of physical blocks of memory.

25. A zone-based block management and address mapping method according to claim 19, further comprising configuring some of the zones with different numbers of physical blocks of memory.

26. A zone-based block management and address mapping method according to claim 19, wherein the zone-based map includes a global mapping table for mapping between logical block number and zone number for the multiple zones.

27. A zone-based block management and address mapping method according to claim 26, wherein the global mapping table is further configured for mapping between logical blocks and physical blocks of memory for block zones.

28. A zone-based block management and address mapping method according to claim 27, wherein the zone-based map further comprises a plurality of zone mapping tables for mapping between logical and physical pages of memory for page zones.

29. A zone-based block management and address mapping method according to claim 28, wherein the global mapping table includes a physical block number for representing an associated entry that is mapped to one of the plurality of zone mapping tables.

30. A zone-based block management and address mapping method according to claim 29, wherein the physical block number is −1.

31. A zone-based block management and address mapping method according to claim 28, further comprising receiving an access request associated with a logical page number, and searching the global mapping table to obtain a zone number of the multiple zones based on a calculated logical block number.

32. A zone-based block management and address mapping method according to claim 31, wherein if the zone number corresponds to one of the page zones, the method further includes searching the zone mapping table of the corresponding zone to obtain a physical page number, and delivering the request based on the zone number and physical page number of the corresponding zone.

33. A zone-based block management and address mapping method, according to claim 31, wherein if the zone number corresponds to one of the block zones, the method further includes obtaining a physical block number directly from the global mapping table, and delivering the request based on the zone number, the physical block number of the corresponding zone and a block offset.

34. A zone-based block management and address mapping method according to claim 19, wherein the memory includes volatile or non-volatile memory.

35. A zone-based block management and address mapping method according to claim 19, further comprising assigning a portion of the memory as a buffer zone for classifying a workload to be managed by the method,
wherein the buffer zone includes a plurality of physical blocks of the memory, and the workload is classified when the zone buffer is determined to be full.

36. A zone-based block management and address mapping method according to claim 35, wherein if a page count of a physical block of memory in the buffer zone exceeds a predefined threshold, the method further includes moving data in the associated physical block in the buffer zone to the block zones, wherein the predefined threshold is adjustable in accordance with the classified workload.

37. A zone-based block management and address mapping method according to claim 35, wherein if a page count of a physical block of memory in the buffer zone is below the predefined threshold, the method further includes moving data in the associated physical block in the buffer zone to the page zones, wherein the predefined threshold is adjustable in accordance with the classified workload.

38. A storage device configured for storing data using the zone-based block management and address mapping method of claim 19, the device comprising:
a plurality of Single-level Cell (SLC) memory chips configured as page zones; and
a plurality of Multi-level Cell (MLC) memory chips configured as block zones, wherein the SLC and MLC memory chips respectively store random data and sequential data, and the memory chips are non-volatile memory.

39. A storage device configured for storing data using the zone-based block management and address mapping method of claim 19, the device comprising:
- a plurality of phase-change memory chips (PCRAM) or STT-MRAM memory chips configured as page zones; and
- a plurality of flash memory chips configured as block zones, wherein the PCRAM or STT-MRAM, and flash memory chips respectively store random data and sequential data, and the memory chips are non-volatile memory.

40. A storage device configured for storing data using the zone-based block management and address mapping method of claim 19, the device comprising:
- a plurality of non-volatile memory chips configured as page zones; and
- a magnetic disk configured as block zones, wherein the non-volatile memory chips and magnetic disk respectively store random data and sequential data.

41. A zone-based block management and address map for a storage device, the storage device including memory divided into multiple zones with each zone having a plurality of physical blocks of the memory, the map comprising a global mapping table for mapping between logical block number and zone number of memory, the global mapping table is further configured for mapping between logical blocks and physical blocks for block zones; and a plurality of zone mapping tables for mapping between logical and physical pages of memory for page zones.

42. A storage device comprising:
- memory divisible into multiple zones, each zone comprising a plurality of physical blocks of the memory and for associating with a zone-based address map for mapping between logical and physical addresses of said zone,
- wherein the multiple zones are configurable independently of each other and wherein the zone-based address map includes a global mapping table for mapping between logical block number and zone number for the multiple zones, and a plurality of zone mapping tables for mapping between logical and physical pages of memory for page zones.

43. A zone-based block management and address mapping method for a storage device including memory, the method comprising:
- dividing the memory into multiple zones, each zone comprising a plurality of physical blocks of the memory; and
- associating each zone with a zone-based address map for mapping between logical and physical addresses of said zone,
- wherein the multiple zones are configurable independently of each other and wherein the zone-based map includes a global mapping table for mapping between logical block number and zone number for the multiple zones, and a plurality of zone mapping tables for mapping between logical and physical pages of memory for page zones.

* * * * *